US008223515B2

(12) United States Patent
Abolhassani et al.

(10) Patent No.: US 8,223,515 B2
(45) Date of Patent: Jul. 17, 2012

(54) PRE-CHARGING AN INVERTER USING AN AUXILIARY WINDING

(75) Inventors: Mehdi Abolhassani, Austin, TX (US);
Thomas Keister, Georgetown, TX (US);
Alex Skorcz, Cedar Park, TX (US);
Ryan Edwards, Round Rock, TX (US);
Enrique Ledezma, Austin, TX (US)

(73) Assignee: TECO—Westinghouse Motor Company, Round Rock, TX (US)

( * ) Notice: Subject to any disclaimer, the term of this patent is extended or adjusted under 35 U.S.C. 154(b) by 649 days.

(21) Appl. No.: 12/393,229

(22) Filed: Feb. 26, 2009

(65) Prior Publication Data

US 2010/0213921 A1   Aug. 26, 2010

(51) Int. Cl.
*H02J 1/10* (2006.01)
(52) U.S. Cl. ............... 363/65; 363/34; 363/37; 363/39; 363/71; 363/78; 363/84
(58) Field of Classification Search ............... 363/34, 363/37, 49, 56.01, 56.02, 56.03, 65, 71, 95, 363/98, 131, 132; 336/170, 180, 212, 214, 336/215, 220
See application file for complete search history.

(56) References Cited

U.S. PATENT DOCUMENTS

| | | | |
|---|---|---|---|
| 3,581,212 A | 5/1971 | McMurray | |
| 3,867,643 A | 2/1975 | Baler et al. | |
| 4,052,657 A | 10/1977 | Kleiner et al. | |
| 4,611,167 A | 9/1986 | Ten Haagen | |
| 4,674,024 A | 6/1987 | Paice et al. | |
| 4,937,513 A | 6/1990 | Hoemann et al. | |
| 5,619,407 A | 4/1997 | Hammond | |
| 5,625,545 A | 4/1997 | Hammond | |
| 5,638,263 A * | 6/1997 | Opal et al. | 363/65 |
| 5,734,565 A | 3/1998 | Mueller et al. | |
| 5,790,396 A | 8/1998 | Miyazaki et al. | |
| 5,841,645 A | 11/1998 | Sato | |
| 5,986,909 A | 11/1999 | Hammond et al. | |
| 6,005,788 A | 12/1999 | Lipo et al. | |
| 6,011,338 A | 1/2000 | Bell et al. | |
| 6,014,323 A | 1/2000 | Aiello et al. | |

(Continued)

FOREIGN PATENT DOCUMENTS

WO  WO 98/34239   8/1998

OTHER PUBLICATIONS

Dr. Keith Corzine, "Operation and Design of Multilevel Inverters," Developed for the Office of Naval Research, Dec. 2003, Revised Jun. 2005, pp. 1-79.

(Continued)

*Primary Examiner* — Adolf Berhane
*Assistant Examiner* — Lakaisha Jackson
(74) *Attorney, Agent, or Firm* — Trop, Pruner & Hu, P.C.

(57) ABSTRACT

A transformer module includes a main primary winding coupled to a first input power source to receive a medium voltage signal, multiple main secondary windings each to couple to a power cell of a drive system, and an auxiliary primary winding coupled to a second input power source to receive a low voltage signal. The auxiliary primary winding can be spatially separated from the main windings to increase leakage inductance. The auxiliary primary winding can be active during a pre-charge operation to pre-charge the power cells.

18 Claims, 8 Drawing Sheets

U.S. PATENT DOCUMENTS

| | | | |
|---|---|---|---|
| 6,031,738 A | 2/2000 | Lipo et al. | |
| 6,054,674 A * | 4/2000 | Moriguchi et al. | 219/130.21 |
| 6,100,781 A | 8/2000 | Raets et al. | |
| 6,166,513 A | 12/2000 | Hammond | |
| RE37,126 E | 4/2001 | Peng et al. | |
| 6,229,722 B1 | 5/2001 | Ichikawa et al. | |
| 6,236,580 B1 | 5/2001 | Aiello et al. | |
| 6,262,555 B1 | 7/2001 | Hammond et al. | |
| 6,320,767 B1 | 11/2001 | Shimoura et al. | |
| 6,340,851 B1 | 1/2002 | Rinaldi et al. | |
| 6,377,478 B1 | 4/2002 | Morishita | |
| 6,392,907 B1 | 5/2002 | Ichikawa | |
| 6,621,719 B2 | 9/2003 | Steiner et al. | |
| 6,653,744 B2 | 11/2003 | Stricker | |
| 6,697,271 B2 | 2/2004 | Corzine | |
| 6,898,095 B2 | 5/2005 | Bijlenga et al. | |
| 7,068,524 B2 * | 6/2006 | Nakagawa et al. | 363/67 |
| 7,088,073 B2 | 8/2006 | Morishita | |
| 7,164,201 B2 | 1/2007 | Manz et al. | |
| 7,190,070 B2 | 3/2007 | Manz et al. | |
| 7,242,584 B2 | 7/2007 | Kroneder | |
| 7,301,427 B2 | 11/2007 | Chang | |
| 7,359,220 B2 | 4/2008 | Berghegger | |
| 7,511,975 B2 * | 3/2009 | Hammond | 363/49 |
| 7,830,681 B2 * | 11/2010 | Abolhassani et al. | 363/37 |
| 7,880,343 B2 * | 2/2011 | Kleinecke et al. | 307/412 |
| 7,940,537 B2 * | 5/2011 | Abolhassani et al. | 363/65 |
| 8,045,346 B2 * | 10/2011 | Abolhassani et al. | 363/37 |
| 2007/0064366 A1 * | 3/2007 | Hammond | 361/93.1 |
| 2008/0079314 A1 | 4/2008 | Hammond | |
| 2008/0081244 A1 | 4/2008 | Hammond | |
| 2008/0088186 A1 | 4/2008 | Hammond | |
| 2008/0186750 A1 | 8/2008 | Gilmore | |
| 2009/0021922 A1 | 1/2009 | Popp et al. | |

OTHER PUBLICATIONS

U.S. Appl. No. 12/495,359, Filed on Jun. 30, 2009 entitled, "Pluggable Power Cell for an Inverter," by Enrique Ledezma, et al.

U.S. Appl. No. 12/317,957, filed Dec. 31, 2008 entitled, "Partial Regeneration in A Multi-Level Power Inverter," by Mehdi Abolhassani, et al.

U.S. Appl. No. 12/495,385, filed Jun. 30, 2009 entitled, "Providing Modular Power Conversion," by Enrique Ledezma, et al.

* cited by examiner ural requirement of the pre-charge circuit is to minimize peak current flowing out from the power source by slowing down the dV/dT of the input power voltage. However, known pre-charge circuits can be complex and significantly add to component costs, increase size and weight of the drive, and can have reliability issues.

PRE-CHARGING AN INVERTER USING AN AUXILIARY WINDING

BACKGROUND

Generally, equipment referred to as a power converter, inverter or drive is used to provide power to another piece of equipment such as a motor. Specifically, such a converter (converter is used generally herein to refer to converters, inverters and drives) is coupled to a utility connection to receive incoming input power such as three-phase AC power. The converter conditions the power to provide a conditioned power signal to the equipment to be powered. In this way, incoming power to the equipment may be of improved efficiency, leading to reduced costs to operate the equipment.

Multi-level power converters have been gaining popularity mainly due to improved power quality, lower switching losses, better electromagnetic compatibility, and higher voltage capability. These improvements in power conversion are achieved by using a multiple voltage step strategy. One common multi-level inverter topology is a series H-bridge inverter, in which multiple H-bridge inverters are connected in series. Since this topology consists of series power conversion cells, the voltage and power level may be easily scaled.

Typically, commercial converters are built up based on modular units, namely, power conversion cells, which are generally formed of a three-phase diode-based front-end rectifier, a DC-link capacitor bank, and a single-phase full-wave inverter. Using such cells, improved power quality at both the AC system and the motor sides can be realized.

In a three-phase inverter, the sum of three-phase instantaneous output power is almost constant if the load does not change. But in a single-phase inverter, the instantaneous output power varies with time. Hence, the output energy of a capacitor bank of the power cell also varies and causes voltage ripple in the DC bus. Therefore, a very large capacitor bank has to be used in order to secure enough energy storage in the DC-link and reduce the voltage ripple.

In-rush currents into capacitive components are a key concern in power-up stress to components. As mentioned above, large amounts of capacitance are present in medium voltage drives to reduce the voltage ripple in power cells and increase power quality at the utility side. The in-rush current to charge the capacitor banks can be extremely high. This high in-rush current can severely stress the converter's fuses, input rectifiers, transformers and power switches, and can significantly reduce the reliability and life expectancy of the modules. Industrial facilities such as manufacturing plants often have multiple supplies on a line, and the combined in-rush current can trip a circuit breaker. The resulting unplanned downtime is extremely expensive and reduces the profits.

Large in-rush currents degrade the performance and life-time of a drive in a number of ways. The sparking of the switch contacts leads to premature switch failure; it can also cause the line circuit breaker to trip, especially if there are multiple power supplies on the same circuit; the current can thermally over-stress the input rectifiers, causing immediate power cell failure; high currents on the fuse cause heating, which can slowly degrade the fuse over time; and high in-rush current also stresses the transformer modules and reduces their life or may cause failure in windings.

Thus large in-rush current to a drive at power-up challenges designers to apply different techniques to control the capacitor in-rush current by using pre-charge circuits. The func-

SUMMARY OF THE INVENTION

One aspect of the present invention is directed to a transformer module for a medium voltage drive. The transformer module includes a main primary winding coupled to a first input power source to receive a medium voltage signal, multiple main secondary windings each to couple to a power cell of the drive, and an auxiliary primary winding coupled to a second input power source to receive a low voltage signal. The auxiliary primary winding can be spatially separated from the main windings to increase leakage inductance. The auxiliary primary winding can be active during a pre-charge operation to provide the low voltage signal to the power cells via the main secondary windings. In addition to an auxiliary primary winding, one or more auxiliary secondary windings may be present in a transformer module to power other equipment of a drive during normal operation.

Another aspect of the present invention is directed to a medium voltage drive system that includes a transformer module switchably coupled to receive one of a low voltage signal and a medium voltage signal, and having a main primary winding coupled to receive the medium voltage signal. The module further includes multiple main secondary windings each coupled to a power cell. In addition, the module includes an auxiliary primary winding coupled to receive the low voltage signal. The auxiliary primary winding may receive the low voltage signal during a pre-charge of the drive and during a power loss event, and otherwise the auxiliary primary winding is deactivated and the main primary winding is to receive the medium voltage signal. In a particular drive system, multiple transformer modules each generally arranged the same can be present to power the drive.

Yet another aspect is directed to a method for controlling a drive to handle pre-charging and normal operations. The method may include switching a low voltage signal to an auxiliary primary winding of a transformer having a main primary winding and main secondary windings. This low voltage signal may be switched in to pre-charge capacitors associated with power cells of the drive. Then the low voltage signal is unswitched from the auxiliary primary winding and a medium voltage signal is switched to the main primary winding, e.g., when a predetermined voltage level of the capacitors has been reached. If during normal operation a loss of the medium voltage signal is detected, the low voltage signal can be switched to the auxiliary primary winding to provide for extended ride-through.

DETAILED DESCRIPTION

In various embodiments pre-charging of cascaded medium voltage drives (both symmetric and asymmetric) can be realized using an auxiliary power source, such as provided through an auxiliary coil of a transformer module of the drive. In so doing, pre-charging can be realized with less complexity, less part count, and less cost over existing methods. In addition to pre-charging, one or more auxiliary sources such as one or more auxiliary windings can be used for voltage sensing (e.g., via an integrated voltage sensing winding) and/or for supplying power to cooling fans or other non-power related portions of a drive.

Figure 1:
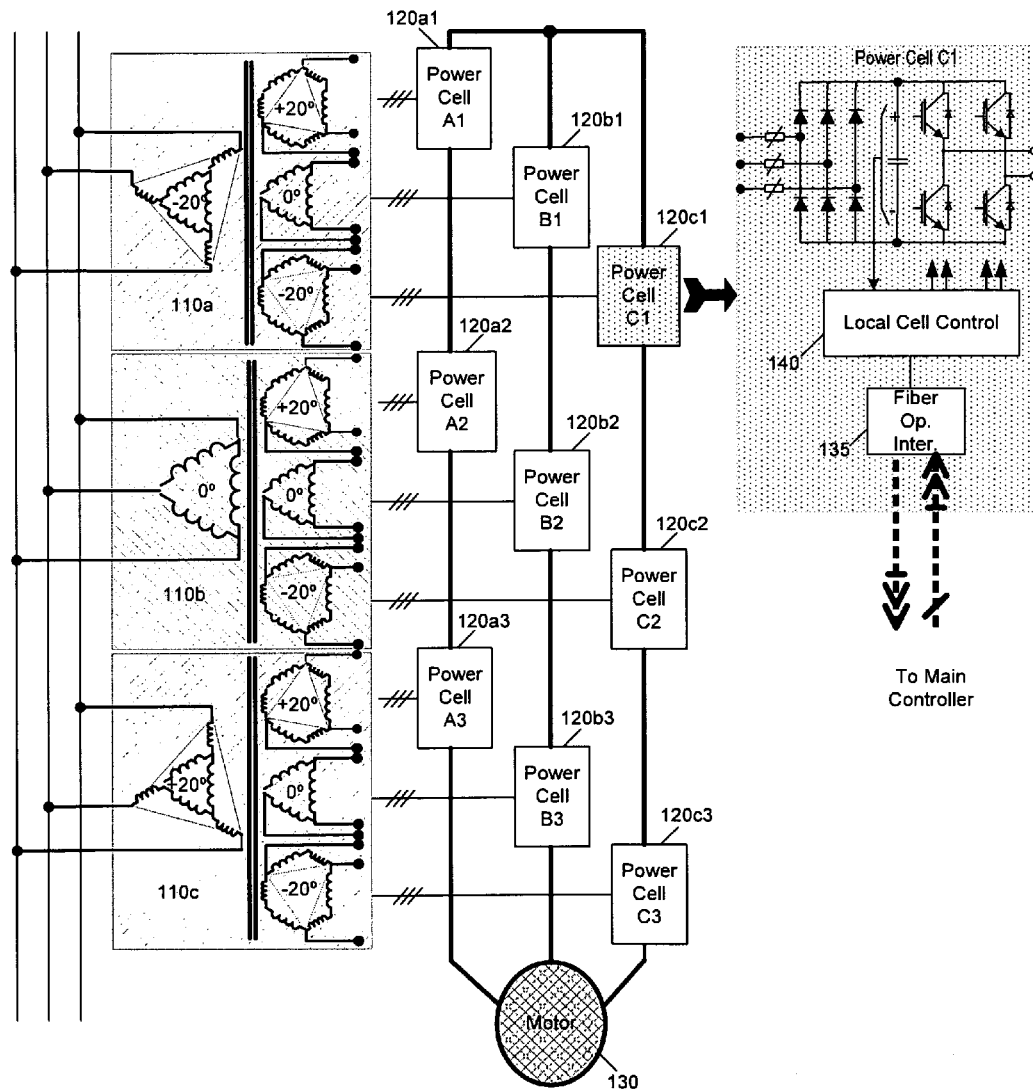
FIG. 1 is a block diagram of an inverter in accordance with an embodiment of the present invention.

Referring now to FIG. 1, shown is a block diagram of an inverter in accordance with an embodiment of the present invention. More specifically, FIG. 1 shows an implementation of a cascaded medium voltage inverter for a three-phase motor. As shown in FIG. 1, inverter 100 may include modular transformers $110_a$-$110_c$ with passive phase shifting, realized by both phase shifting of primary windings and secondary windings to minimize the harmonics in the main current. Implementations of such phase-shifting transformers are described in more detail in U.S. patent application Ser. Nos. 12/284,649 and 12/284,654, commonly assigned herewith, the disclosures of which are hereby incorporated by reference. Of course, embodiments may be implemented by other types of transformers, both phase shifted and non-phase shifted. In this example, the primaries are phase shifted by 20° and the secondaries are phase shifted by 20°. Thus in the embodiment of FIG. 1, an equivalent 54-pulse transformer can be realized using the 18-pulse transformers $110_a$-$110_c$ with phase shifted primaries. The outputs of the modular transformers may be provided to power cells $120_{a1}$-$120_{c3}$.

In the configuration of FIG. 1, three cells in series (e.g., cells $120_{a1}$-$120_{a3}$) may form one motor phase voltage. The actual number of series-connected cells is determined by the required load voltage and power. The phase voltages of the load (e.g., motor 130) are the summation of the single-phase voltage generated by each cell. In the example shown in FIG. 1, each power cell $120_{a1}$-$120_{c3}$ has passive diode front-end rectifiers that in turn are coupled to DC bus capacitors, and which are further coupled to the inverters of the cells. As shown in this embodiment, each power cell 120 may have an H-bridge inverter, although the scope of the present invention is not limited in this regard.

Note that in the embodiment of FIG. 1, a main controller may be coupled to the power cells (note the connections are not shown in FIG. 1 for ease of illustration) and may communicate with a fiber optic interface 135 that in turn is coupled to a local controller 140. This control scheme is representative, and in particular implementations multiple different controllers may be provided, e.g., local controllers associated with one or more power cells, and a master controller to control the drive system as a whole. Local cell controller 140 may provide control of the IGBTs of power cells $120_{a1}$-$120_{c3}$.

Figure 2:
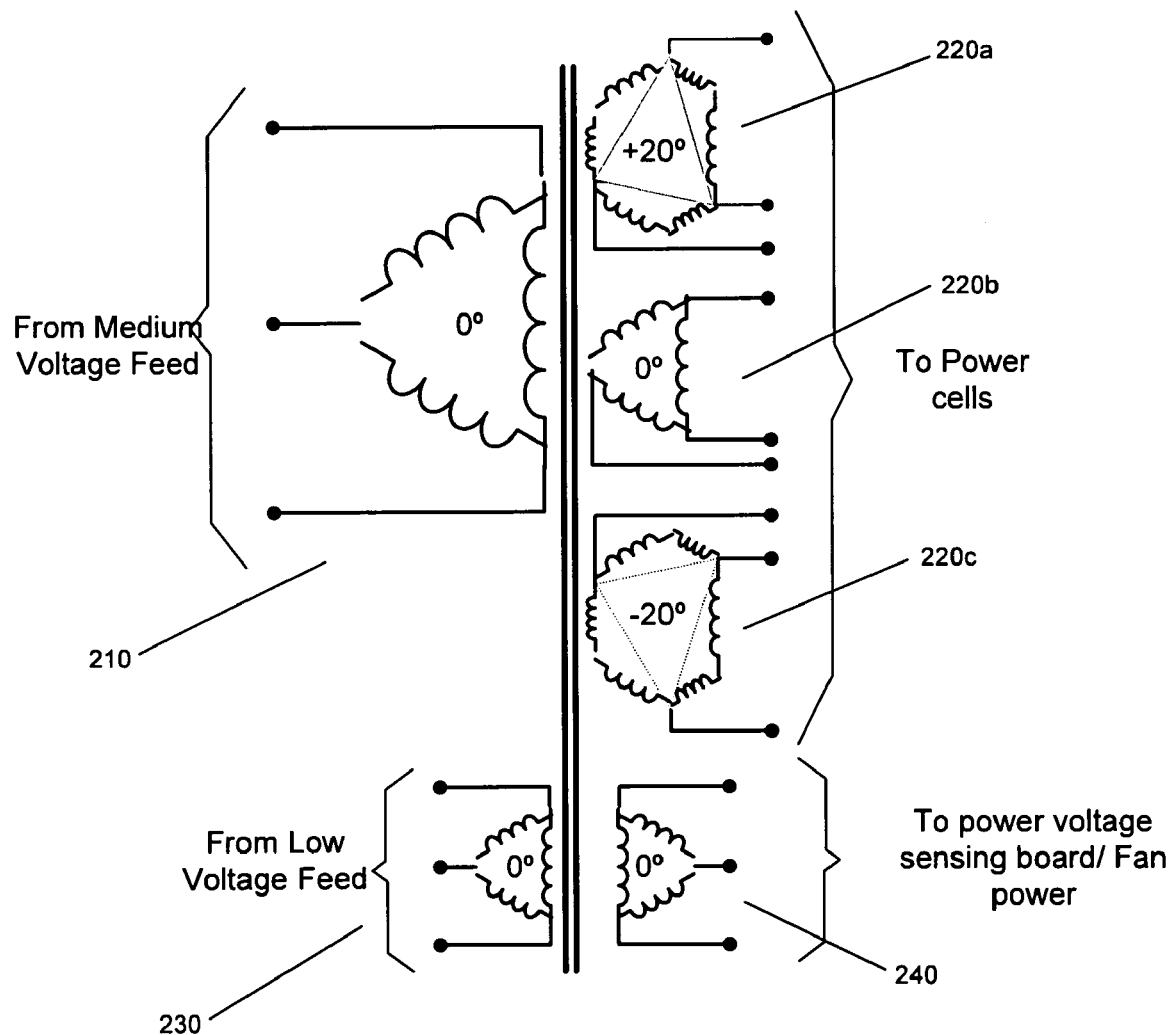
FIG. 2 is a block diagram of a modular transformer in accordance with one embodiment of the present invention

FIG. 2 shows a block diagram of a modular transformer in accordance with one embodiment of the present invention. As shown in FIG. 2, transformer 200 may include a pair of auxiliary windings, in addition to its main primary and secondary windings. In the particular embodiment of FIG. 2, a main primary winding 210 is present, which may be a three-phase medium voltage winding that receives medium voltage power feed, e.g., from a utility connection. As used herein in the context of a medium voltage drive, the term "medium voltage" or "MV" is used to denote voltage between approximately 1000 and 69000 volts. In turn, a set of main secondary windings $220_a$-$220_c$, each of which may be a three-phase secondary winding may provide normal operating power to the power cells. As shown in the embodiment of FIG. 2, main secondary windings 220 may be phase shifted, where each winding is phase shifted by 20 degrees from its neighboring secondary winding, however the scope of the present invention is not limited in this regard.

In addition to the main windings for powering the power cells during normal operation, transformer 200 may further include auxiliary windings to enable pre-charging as well as to handle auxiliary functions, such as for diagnostics, voltage sensing, fan power and so forth. As shown in FIG. 2, such auxiliary windings include a low voltage auxiliary primary winding 230, which as shown may be a three-phase winding. Auxiliary primary winding 230 may be coupled to receive low voltage power from a given low voltage source. As used herein in the context of a medium voltage drive, the term "low voltage" or "LV" is used to denote voltages of 1000 volts and below. In addition, a low voltage auxiliary secondary winding 240 which may also be a three-phase winding may be used to provide power for diagnostic purposes, e.g., voltage sensing, as well as to provide fan power for cooling. In the embodiment shown in FIG. 2, these auxiliary windings are not phase-shifted, although such windings could be phase shifted in some implementations.

Figure 3:
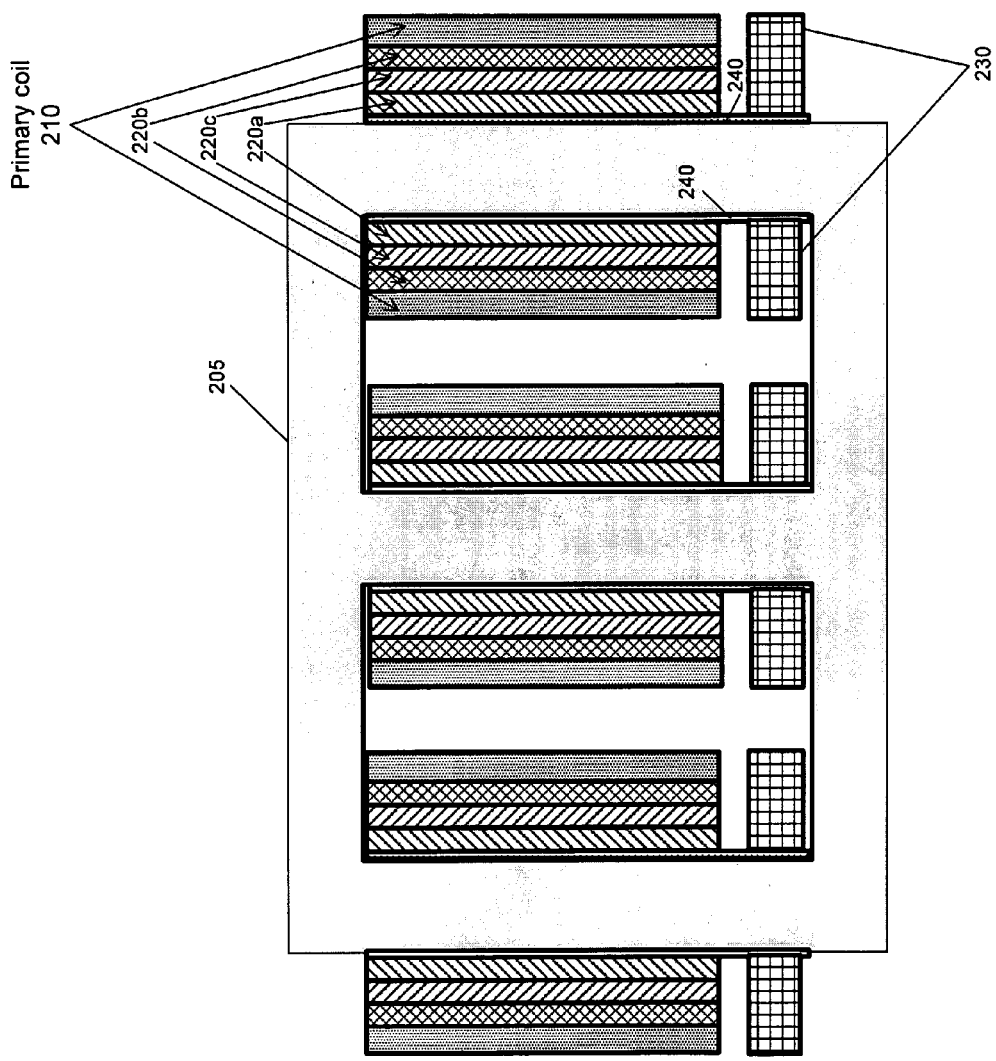
FIG. 3 is an illustration of an example embodiment of a winding geometry for a modular transformer.

As seen in FIGS. 2 and 3, auxiliary primary winding 230 is loosely coupled to the main secondary and primary windings. The geometry configuration of the primary auxiliary winding may be spatially separated from secondary windings and main primary windings to provide decoupled leakage inductances. Auxiliary primary winding 240 may be wound and configured to have very large leakage inductances by creating loose coupling with other windings, and/or spatial separation from other coils or an iron core, and/or by employing other methods. Having large inductance (i.e., leakage inductance) in the primary LV auxiliary winding eliminates the need to switch high impedance components (e.g., a resistor) in series with a pre-charge circuit. The primary LV auxiliary winding inherently has high impedance due to its special configuration and geometry. Hence, the pre-charge system becomes less complex and fewer components are used. While the scope of the present invention is not limited in this regard, the impedance of the primary LV auxiliary winding may be between approximately 15% and 150% per unit for a MV drive.

By separating a transformer into modular units, there is more surface area for the core and thus it can dissipate heat more effectively. Further, each modular core volume may reduce in size since the winding window may only need to accommodate one or a small number of secondary windings per output phase. The modular approach allows a single unit transformer to be used across a wide voltage and power range. By increasing the number of modular units, a converter in accordance with an embodiment of the present invention is capable of higher voltage and power with lower harmonic distortion. Modular units can easily be removed to reduce cost and efficiently accommodate lower voltages.

In one embodiment of a drive system having multiple modular transformers, the amount of phase shift of secondary and primary windings can be calculated according to the following equations:

$$N_S = \frac{N_{dc}}{N_T} \quad \text{[EQ. 1]}$$

$$\alpha_{sec} = \frac{360}{2 \cdot N_{ph} N_s} \quad \text{[EQ. 2]}$$

$$\alpha_{prim} = \frac{\alpha_{sec}}{N_T} \quad \text{[EQ. 3]}$$

where $N_T$ is the number of transformer modules; $N_{dc}$ is the number of isolated DC sources; $N_S$ is an integer number of the number of secondary windings in each transformer; $N_{ph}$ is the number of phases of a supply; $\alpha_{sec}$ is the secondary windings phase shift in each module; and $\alpha_{prim}$ is the primary winding phase shift in each module.

Modular transformers may be manufactured using transformer manufacturing techniques and implementing various types of winding designs for both primary and secondary windings. Primary windings may include both extended delta configurations and a standard delta configuration. However, the connection of primary and secondary windings can be freely chosen. In various implementations, a desired phase shift may be realized by changing the geometry of the winding, e.g., by adjusting the number of turns of one or more coils of the transformer or taps with regard to other coils. By controlling the number of turns of coils and connection method of them, a given phase shift can be realized. Secondary windings can include standard delta configurations, as well as polygon configurations, where again by changing the size and/or turns of one or more coils, different phase shifts can be obtained. Of course, other configurations or connections can be used to realize a desired phase shift in different implementations.

FIG. 3 is an illustration of an example embodiment of a winding geometry of a modular transformer. As shown in FIG. 3 is a geometric illustration of a modular transformer 200. As seen, transformer 200 may be a single modular transformer having a generally horizontal configuration (i.e., the windings are wrapped horizontally) with a core 205, which may be an iron core having the different windings, both main and auxiliary, wrapped around columns of the core. However the scope of invention is not limited to only horizontal configuration as this method can be applied to conventional vertical configuration too. While FIG. 3 shows a three-phase configuration, and thus having three columns for supporting windings, reference herein will be with regard to a single phase. As shown, a spatial separation exists between the main coils and the primary LV auxiliary coil. This configuration causes a loose coupling with other windings and a high leakage inductance for the LV primary auxiliary windings. However, the scope of invention is not limited in this aspect and any other methods can be applied to generate high leakage inductances for the primary LV auxiliary winding. While the scope of the present invention is not limited in this regard, in a medium voltage implementation in which core 205 is approximately 2 to 10 feet high, this separation may be on the order of between approximately 0.5 and 6 inches to provide the desired high leakage inductance between the primary auxiliary winding 230 and the main secondary windings 220 and main primary winding 210.

As seen, the configuration of the main secondary windings 220 is such that these windings are wrapped concentrically around each other, and further that these windings are also concentrically wrapped around the auxiliary secondary winding 240. Note that in the implementation of FIG. 3, auxiliary secondary winding 240 may extend substantially along the entirety of the column length of core 205 and may have the main secondary windings 220 wrapped there around.

Thus in the particular implementation, the secondary windings 220 may be next concentrically adapted, e.g., in order of a first phase-shifted secondary winding 220a, a second phase-shifted secondary winding 220c, and finally a non-phase shifted secondary winding 220b. Finally, wrapped concentrically around these windings is the main primary winding, MV winding 210. The spacing between coils corresponds to cooling method and isolation and voltage level of the coils. This method can be applied to natural cooled, forced air cooled, and water cooled transformers. Various transformer manufacturing techniques can be used in realizing the coils and insulation. As examples, different wire types (e.g., round, square, or so forth) and different insulation materials (e.g., Nomex™ felt or paper insulation, fiber, wood, epoxy, or so forth) can be used.

The configuration shown in FIG. 3 thus provides for loose coupling between the primary auxiliary winding 230 and the main windings 210 and 220 (in particular, main secondary windings 220). However, different winding geometries or methods can be implemented to provide high leakage inductance for the LV auxiliary primary winding. As an example, a winding such as that of U.S. Pat. No. 6,100,781, which is hereby incorporated by reference, can be used.

Using auxiliary windings in accordance with an embodiment of the present invention at power-up of a drive, power is supplied through the high leakage inductance LV auxiliary primary winding(s). The high inductance of this set of windings can slow the rate of capacitor charging and limit the in-rush current to the drive. As described above, the LV auxiliary primary winding can be designed to be supplied by single-phase or three-phase at any available voltage. Auxiliary power may be supplied from any kind of power supply, such as an uninterruptible power supply (UPS), a low voltage soft capacitor charger, high frequency power supply, portable generator, battery bank with inverter, and/or low voltage utility lines. For higher power and voltage drives, a low voltage soft capacitor charger may charge the capacitors through the LV primary auxiliary winding.

The LV auxiliary primary winding can be designed to charge the power cells via the main secondary windings to at least a threshold level of DC-bus voltage of power cells (e.g., 50% of rated voltage or the minimum voltage at which the power cells are operable). The pre-charge may be performed in two steps. Step one is to use the LV auxiliary primary winding to charge the capacitors to at least a threshold level of the power cells (which may correspond to the minimum voltage at which power cells can operate, which for example in a 4160 V drive having 3 power cells in series per phase may be between approximately 200 and 1200 volts). In the second step, the capacitors are charged to their rated voltage (which for example in a 4160 V drive with having 3 power cells in series per phase may be between approximately 900 and 1200 volts) by switching power to the main power source, i.e., through the main primary winding of the transformer. However, the second step can be decreased or eliminated. This procedure can thus provide soft-charging for a MV drive.

In addition to providing pre-charging, auxiliary windings in accordance with an embodiment of the present invention can be used to provide extended ride-through for a drive. Such ride-through is a period of time that a drive can continue to operate without power due to charge stored on the capacitors. In normal conditions, the energy stored in capacitors can provide up to 5 AC cycles of ride-through. However, by implementing this technology, ride-through can be extended, as an example, to 10 or greater cycles. To effect ride-through in accordance with one embodiment of the present invention, when main input power-loss is detected, the main power is switched off and auxiliary power is switched on. The energy can be supplied through the LV auxiliary windings for a limited time to provide extended ride-through. If the power loss is cleared within a thermal limit of the LV auxiliary winding, the auxiliary power is then switched off and main power restored. If the main power loss takes longer than a predetermined time or the thermal limit of the auxiliary winding is reached, the auxiliary power may be shut down and the drive thus ceases operation.

Additional auxiliary secondary windings can be provided for other purposes such as voltage sensing of the input power supply. The input voltage of the drive is continuously monitored for the purpose of detecting the input phase-loss or to monitor the input voltage distortion. In such implementations, a three-phase auxiliary secondary winding can be embedded in the transformer module (such as auxiliary secondary winding 240 of FIG. 3). This winding is designed to provide an isolated tightly regulated LV voltage detectable by electronic circuits (e.g., 36V). Furthermore, this signal can be fed to a signal conditioning board/circuit. In the signal conditioning board, noise is filtered and the amplitude of signal can be further reduced (e.g., −10 to 10 volts) and fed to an analog-to-digital converter circuit (e.g., of a main controller). In this way, input voltage can be sensed directly and the need for a potential transformer or other type of voltage sensors is eliminated.

Furthermore, another auxiliary secondary winding can be embedded into a transformer module for providing power to cooling fans or any other auxiliary power usage. This winding can provide the same voltage rating as the voltage sensing winding or to be designed to provide the voltage level required for cooling fans. In some implementations, each transformer module may include a single auxiliary secondary winding, or a given transformer module may include multiple such auxiliary secondary windings.

Figure 4:
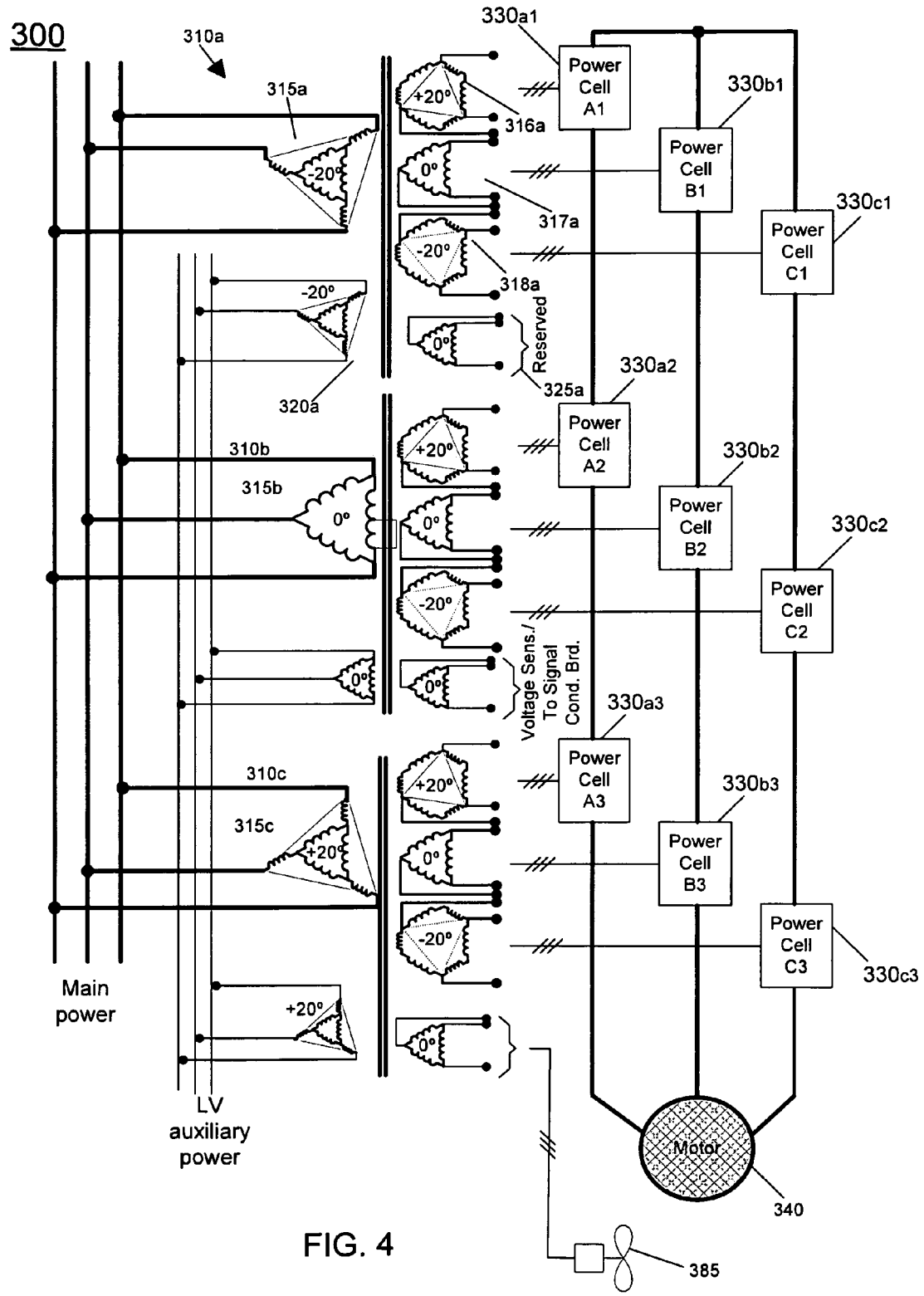
FIG. 4 is a block diagram of a cascaded drive having auxiliary windings in accordance with one embodiment of the present invention.

FIG. 4 is a block diagram of a cascaded MV drive having auxiliary windings in accordance with one embodiment of the present invention. As shown in FIG. 4, drive 300 may include multiple modular transformers $310_a$-$310_c$, each of which includes a main primary winding 315 and main secondary windings 316-318. In addition, each modular transformer includes an auxiliary primary winding 320 and an auxiliary secondary winding 325. Note that in the embodiment of FIG. 4, auxiliary primary windings 320 may be phase shifted and have the same phase values as their corresponding main primary windings 315, while the auxiliary secondary windings 325 are non-phase shifted, although other implementations are possible. As seen, all LV auxiliary primary windings 320 are connected together so the charging current is distributed between all three transformers. In this configuration, the auxiliary secondary winding of one of the transformer modules (e.g., auxiliary secondary winding $325b$) can be used for voltage sensing purposes and one or more auxiliary secondary windings (e.g., auxiliary secondary winding $325c$) can be used for supplying power to a fan 385. The remaining auxiliary windings can be used to provide power to other equipment such as back-up power for drive control circuit.

As further shown in FIG. 4, the secondary windings may be coupled to corresponding power cells of the different phase legs, namely power cells $330_{a1}$-$330_{c3}$. The phase legs are in turn coupled to a motor 340.

Figure 5:
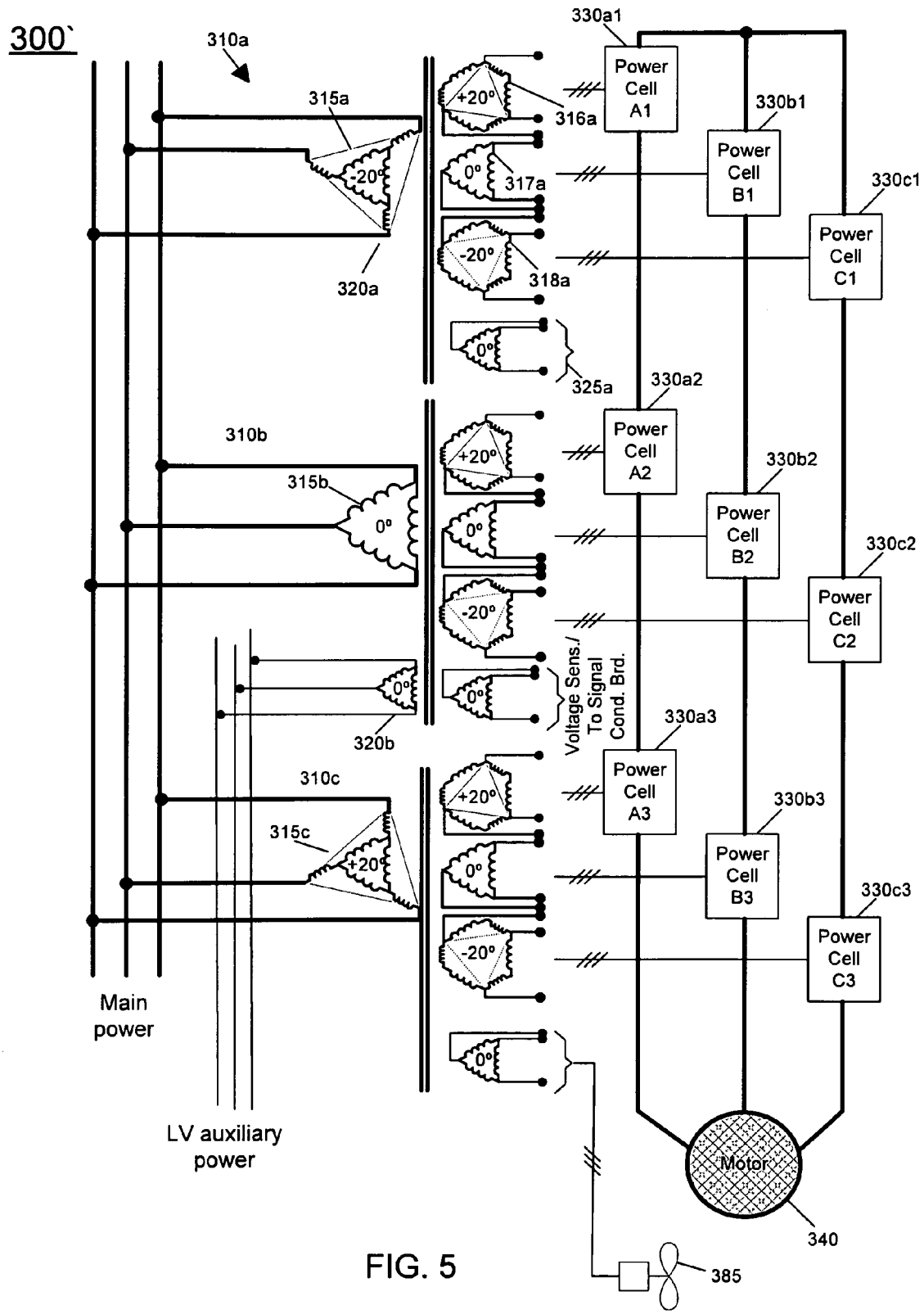
FIG. 5 is a block diagram of a cascaded drive having auxiliary windings in accordance with another embodiment of the present invention.

FIG. 5 is a block diagram of a cascaded drive 300' having auxiliary windings in accordance with another embodiment of the present invention. In contrast to the embodiment of FIG. 4, only one of the transformer modules (i.e., module 310b) is provided with a LV auxiliary primary winding 320b. In this embodiment, all power cells are charged through this auxiliary winding set. Since all the main primary windings are connected (medium voltage windings), the primary auxiliary winding of one transformer module can energize all the transformer modules and charge all the power cells. As with the configuration of FIG. 4, three auxiliary secondary windings 325 are present for voltage sensing and fan power supply usage, and potentially another use.

Figure 6:
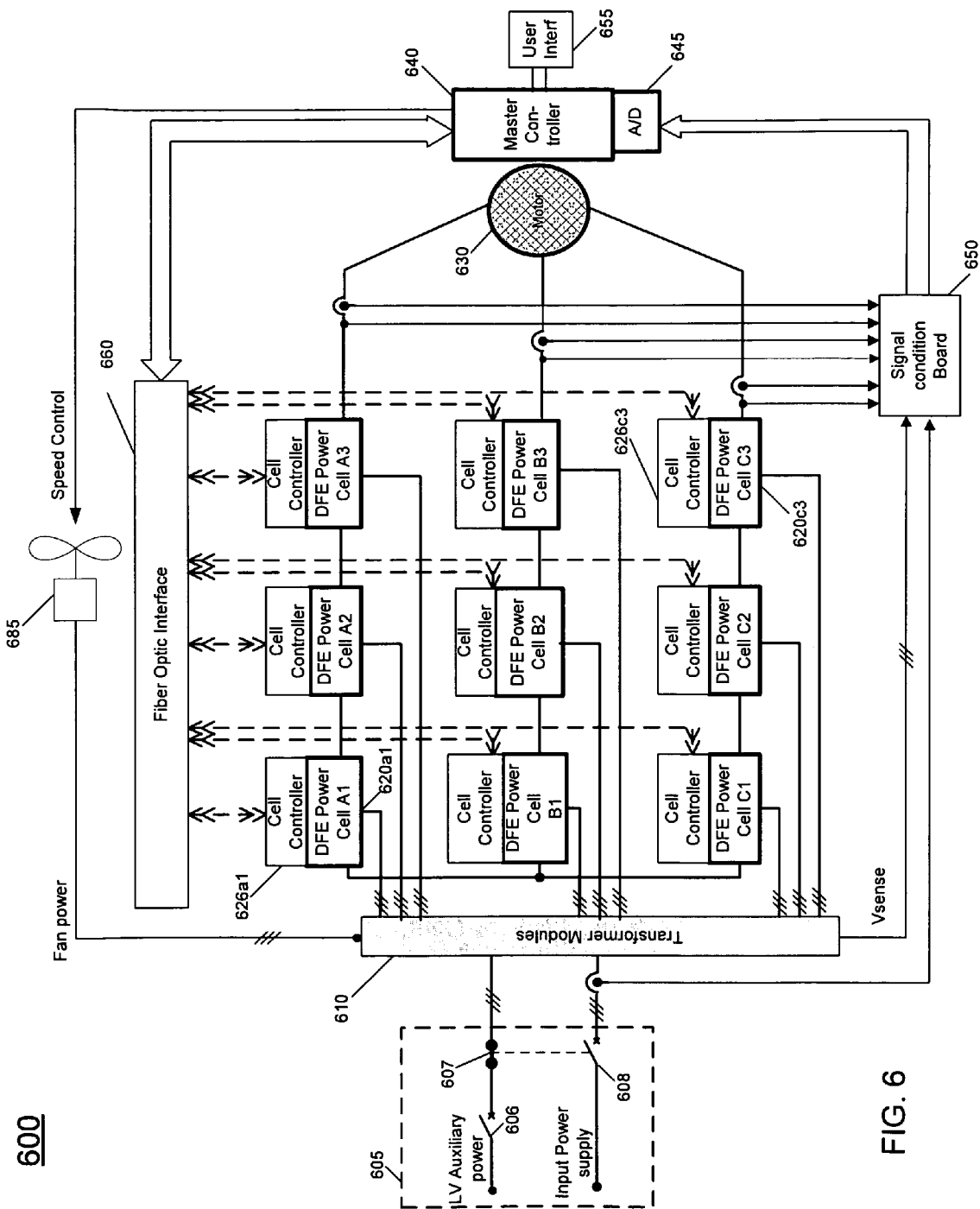
FIG. 6 is a block diagram of a system in accordance with another embodiment of the present invention.

Referring now to FIG. 6, shown is a block diagram of a system in accordance with another embodiment of the present invention. As shown in FIG. 6, system 600 may be a medium-voltage drive. Specifically, in the embodiment of FIG. 6, a three-phase, medium-voltage drive is shown that includes a plurality of power cells $620_{A1}$-$620_{C3}$ (referred to in FIG. 6 as diode front end cells). As seen, a local cell controller $626_{A2}$-$626_{C3}$ is associated with each of the power cells.

As seen, each of these local controllers may communicate with a fiber optic interface 660. In some implementations, a pair of unidirectional fiber optic channels may be coupled between each local controller and fiber optic interface 660. In turn, fiber optic interface 660 communicates with a master controller 640 that further includes an ADC 645.

Master controller 640 may provide control signals to fiber optic interface 660 for transmission to the different local controllers. In one embodiment, these control signals may be voltage reference signals, which cause the local controllers to perform certain processing to generate the needed switching signals. In other implementations, the switching signals themselves may be sent by master controller 640 for transmission to the local cell controllers.

As further seen in FIG. 6, a signal conditioning board 650 may be present to sense or perform signal processing with regard to various information, namely voltage and/or current information obtained both from the input power source and the output of the different phase output lines coupled to a load 630 which in one embodiment may be a motor, as well as from an auxiliary secondary winding in accordance with an embodiment of the present invention.

In addition to the control information described above, additional information from master controller 640 can be provided to the individual local controllers. In addition, the local controllers can provide information such as status information, both as to normal operation as well as faults, over-temperature situations or so forth, back to master controller 640. Master controller 640 may further be associated with a user input device 655 such as a keyboard and/or touch screen display to enable user input to control various features such as speed, torque, selection of different power cells to be enabled and so forth, as well as to provide status information to the user via a given display or other output means.

As shown in FIG. 6, input power to a transformer module 610 may include both a medium voltage source, e.g., from an input power supply such as a utility connection, and a low voltage power source, e.g., from an auxiliary low voltage power source, as discussed above. Such sources may be provided to a customer cabinet 605, which may be at a separate location from drive system 600. Cabinet 605 may include a control circuit to switch between powering of the drive by either the main power source or the auxiliary power source. For example, at power-up, a switch 606, which may be a circuit breaker, of the low voltage auxiliary power line is closed such that power is provided to transformer module 610 through a normally closed contact 607 to enable pre-charging of the capacitors of the different power cells 620 via this low voltage source. Accordingly, the capacitors of power cells 620 are charged through LV auxiliary primary winding(s) of transformer module 610 to a predetermined voltage level. Then after passing of a predetermined time, which may be on the order of approximately 50 to 10000 milliseconds (ms), a main power supply power switch 608 (e.g., a MV circuit breaker) is closed. Normally closed contact 607 can be used to disconnect the LV auxiliary power. By closing the main power supply, the capacitors are thus charged to their rated voltage. A timer or programmable logic controller (PLC) or other type of control circuit can be used to control the process and sequence of switching. In another embodiment, the master controller can determine this charging time by monitoring the DC-bus voltage of one or more power cells. After the capacitors of power cells are charged to a predetermined level, the master controller can send an activation signal to MV circuit breaker 608. However in either implementation method, the sequence of switching for powering-up the drive is first to close the LV auxiliary switch 606 (i.e. circuit breaker). After a predetermined time or receiving a command from a controller, the LV switch 608 is opened and main power switch 608 (i.e., MV circuit breaker) is closed.

During normal operation, if main power loss is detected (in master controller or a local controller in customer cabinet), main power switch 608 is opened and auxiliary power switch 606 can be switched on to provide extended ride through. If the main power is detected within thermal limit of auxiliary primary winding of transformer (which can be detected by thermal sensors or calculated virtually in master controller), the LV auxiliary switch 606 is switched off and main power switch 608 is switched on again. However if during the power loss period, the thermal limit of transformer is reached or a certain amount of time has elapsed, or by a command from master controller, the drive may go to trip status. The sequence of switching can be controller by contactor and relay control circuits, a PLC, drive master controller, or any other type of controller. Also while not shown for ease of illustration, understand that communication may occur between master controller 640 and cabinet 605. While shown with this particular implementation in the embodiment of FIG. 6, the scope of the present invention is not limited in this regard.

Figure 7:
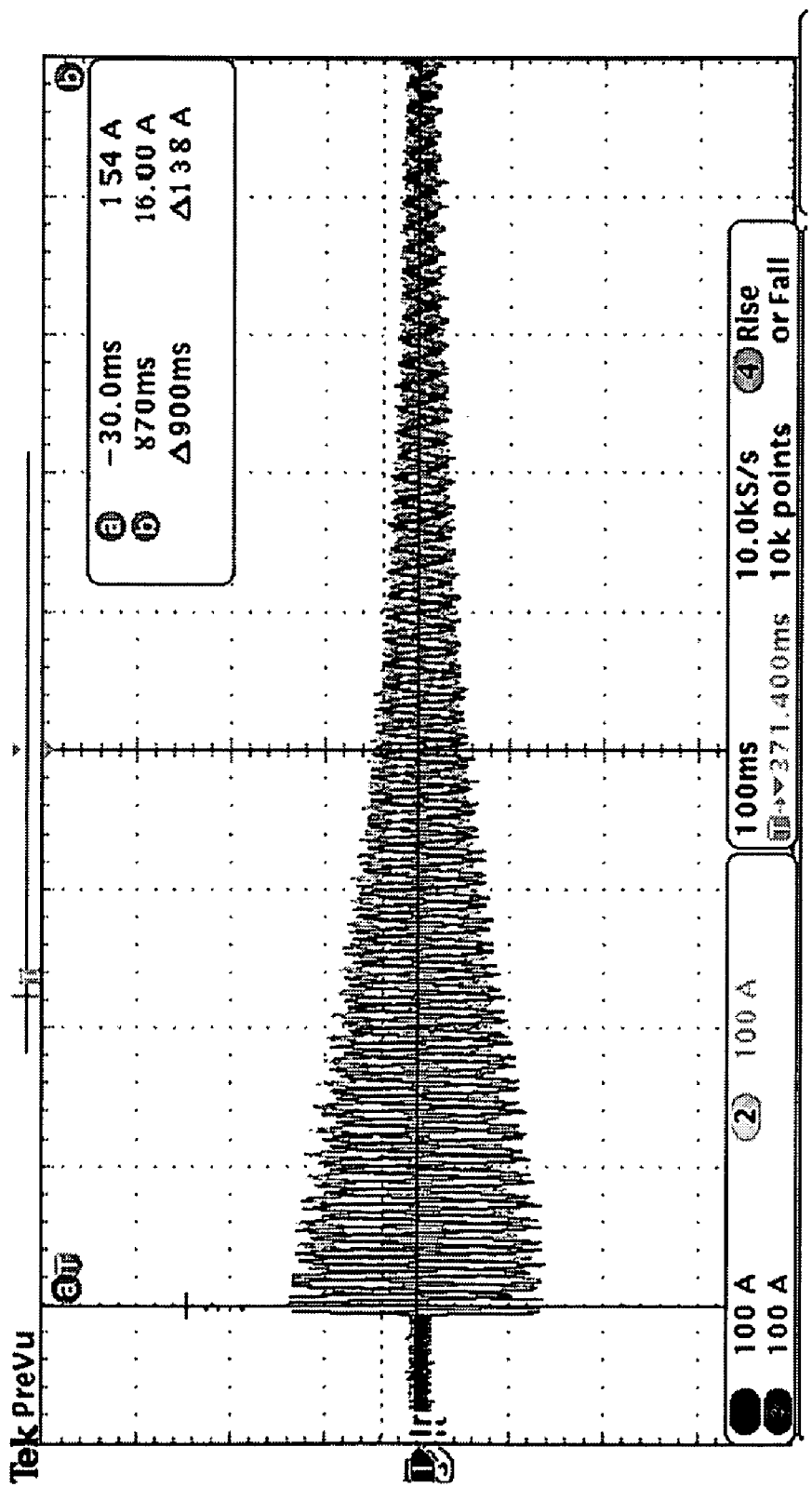
FIG. 7 is a timing diagram of in-rush current realized using a method in accordance with one embodiment of the present invention.

Referring now to FIG. 7, shown is a timing diagram of in-rush current realized using a method in accordance with one embodiment of the present invention. FIG. 7 shows the three-phase in-rush current for an example of a 1MVA, 4160V drive which flows through an example 480V auxiliary primary winding with maximum peak in-rush current of approximately 150 A. As seen, the in-rush current rapidly declines (e.g., in approximately 900 ms) to a very low level, e.g., approximately 16 A. However, if instead the drive was powered up through a main power winding, the in-rush current could go up to 2500 A.

Figure 8:
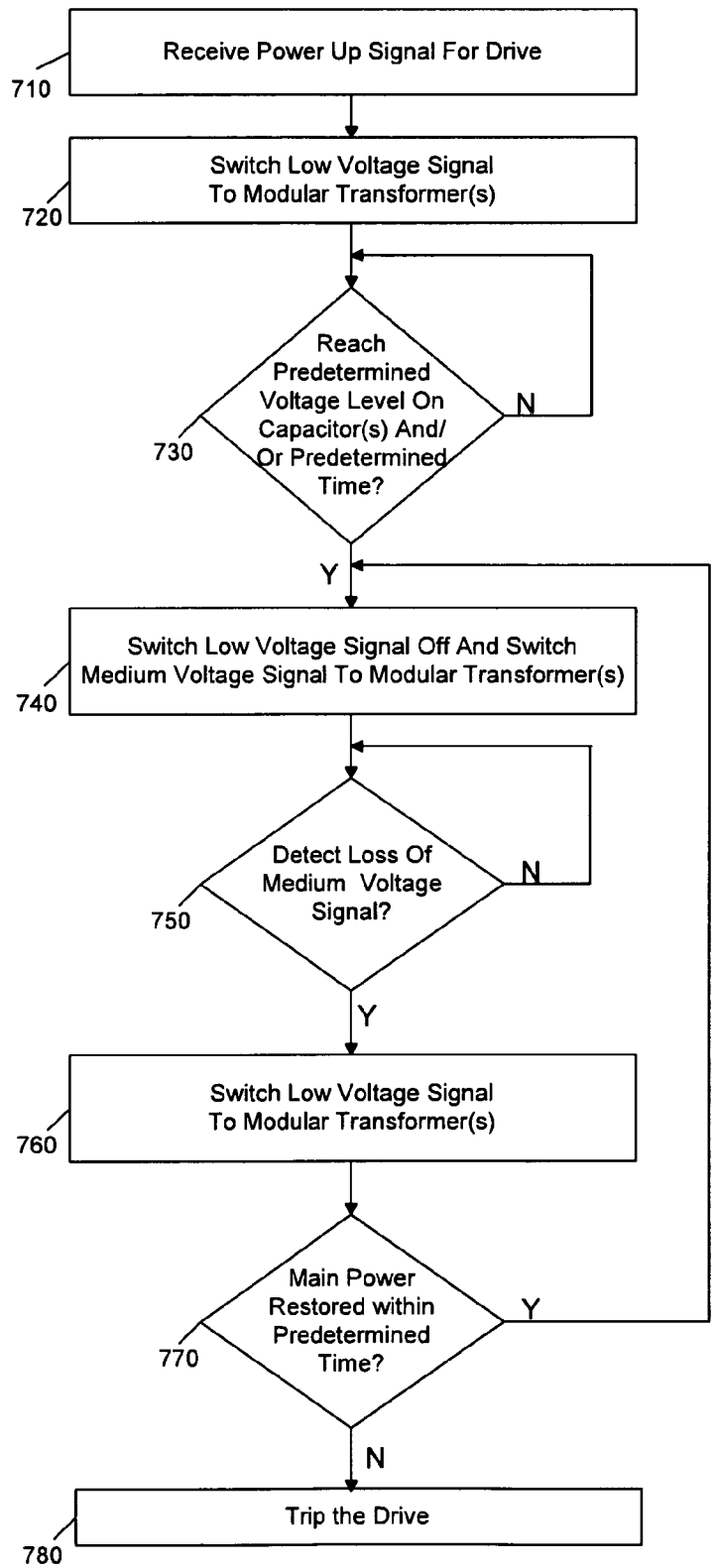
FIG. 8 is a flow diagram of a method in accordance with one embodiment of the present invention.

Referring now to FIG. 8, shown is a flow diagram of a method in accordance with one embodiment of the present invention. Method 700 may be used to control pre-charging of the drive, along with handling faults that may occur during normal operation. Implementation of method 700 may be via a combination of logic of master controller 640 and logic within customer cabinet 605 of FIG. 6. As shown in FIG. 7, method 700 may begin by receiving a power up signal for a drive (block 710). For example, such power up signal may be received in a control circuit, e.g., of a customer cabinet, when a drive is desired to be powered on. Responsive to this signal, a low voltage signal may be switched into one or more modular transformers and more specifically to one or more auxiliary primary windings (block 720). Thus using this low voltage signal, capacitors associated with the power cells may be pre-charged to a predetermined level. Next, it may be determined whether this predetermined voltage level has been reached, and/or a predetermined time period for pre-charging has occurred (diamond 730). In an example in which the master controller controls the switching sequence, the master controller checks the DC bus voltage in all the power cells, and if all of DC buses reach the predetermined level, the master controller sends a command signal to customer cabinet 605 to switch on the main power switch. If not, diamond 730 loops back on itself. If one of these conditions has been met, control passes to block 740 where the low voltage signal may be switched off and a medium voltage signal switched into the modular transformer(s) and more specifically to one or more main primary windings (block 740). Accordingly, final pre-charging, if needed may be performed, and then the drive can enter into normal operation.

During normal operation, the control circuit may detect a loss of a medium voltage signal (diamond 750). The power loss may be detected in master controller 640 or customer cabinet 605. For example, if input power, e.g., from a utility is lost or as result of other failure conditions, such loss may be detected. If this loss is detected, control passes to block 760, where a low voltage signal may be switched into one or more modular transformers, again to the auxiliary primary winding to thus enable extended ride-through operation.

When a drive is supplying power to a load, ride-through operation of the drive, realized by the energy stored in the capacitors, as well as the energy provided via this low voltage signal cannot last indefinitely. Accordingly, if the resumption of the medium voltage signal is not detected within a predetermined time, and/or master controller detects low voltage in one or more DC bus of power cells, and/or master controller detects that the thermal limit of one or more of transformer modules has been reached, the master controller may send a signal to customer control cabinet and/or to the low voltage switch to be switched off and power the drive down (block 770). In the case that a local customer cabinet controller controls the switching sequence and monitors the power loss, a switch off signal may be sent by the local controller present in customer control cabinet 605. Thus as shown in FIG. 8, it may be determined at diamond 770 whether main power has been restored within a predetermined time. If so, normal operation of the device may continue (as control passes back to block 740). Otherwise, the drive may be tripped (block 780). While shown with this particular implementation in the embodiment of FIG. 8, the scope of the present invention is not limited in this regard.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a transformer module for a medium voltage drive, the transformer module including:
   a main primary winding coupled to a first input power source to receive a medium voltage signal therefrom;
   a plurality of main secondary windings each to couple to a power cell of the medium voltage drive; and
   an auxiliary primary winding coupled to a second input power source to receive a low voltage signal therefrom, wherein the auxiliary primary winding is spatially separated from the main primary winding and the plurality of main secondary windings; and
   a cabinet coupled to the transformer module to provide the medium voltage signal and the low voltage signal to the transformer module, wherein the cabinet includes a control circuit to provide the low voltage signal to the transformer module on power up of the medium voltage drive and after a predetermined time or a command signal to switch off the low voltage signal to provide the medium voltage signal to the medium voltage drive, wherein the control circuit is to switch the low voltage signal to the medium voltage drive when a loss of the medium voltage signal is detected during operation of the medium voltage drive.

2. The apparatus of claim 1, wherein the auxiliary primary winding is to provide the low voltage signal to each of the power cells via the plurality of main secondary windings to pre-charge a capacitance associated with the corresponding power cell.

3. The apparatus of claim 1, wherein the spatial separation is to provide a high leakage inductance path between the auxiliary primary winding and the plurality of main secondary windings.

4. The apparatus of claim 1, further comprising a first auxiliary secondary winding of the transformer module to provide a first low voltage signal to a cooling device of the medium voltage drive during normal operation.

5. The apparatus of claim 4, further comprising a second auxiliary secondary winding of the transformer module to provide a second low voltage signal to a voltage sensing device of the medium voltage drive during normal operation.

6. The apparatus of claim 4, wherein the transformer module includes:
a core having at least one column;
the primary auxiliary winding wrapped around a first portion of the at least one column;
the plurality of main secondary windings wrapped concentrically around each other and around a second portion of the at least one column spatially separated from the first portion; and
the main primary winding wrapped around the plurality of main secondary windings.

7. The apparatus of claim 6, wherein the first auxiliary secondary winding is wrapped around the first and second portions of the at least one column, and the plurality of main secondary windings and the main primary winding are concentrically wrapped there around.

8. A medium voltage drive system comprising:
a transformer module switchably coupled to receive one of a low voltage signal and a medium voltage signal, and having a main primary winding coupled to receive the medium voltage signal, a plurality of main secondary windings each coupled to a power cell, and an auxiliary primary winding coupled to receive the low voltage signal, wherein the auxiliary primary winding is spatially separated from the main primary winding and the plurality of main secondary windings, the auxiliary primary winding to receive the low voltage signal during a pre-charge of the medium voltage drive system and during a power loss event, and otherwise the auxiliary primary winding is deactivated and the main primary winding is to receive the medium voltage signal.

9. The medium voltage drive system of claim 8, further comprising a plurality of transformer modules each having a main primary winding, a plurality of main secondary windings and an auxiliary primary winding, wherein the main primary winding and the auxiliary primary winding of each transformer module are at a common phase, and the main primary winding and the auxiliary primary winding of each transformer module is phase-shifted with regard to the main primary winding and the auxiliary primary winding of a neighboring transformer module.

10. The medium voltage drive system of claim 8, further comprising an auxiliary secondary winding of a first transformer module to provide power to a cooling device of the medium voltage drive system.

11. The medium voltage drive system of claim 10, further comprising an auxiliary secondary winding of a second transformer module to provide power to a voltage sensing device of the medium voltage drive system, and wherein the auxiliary secondary windings of the first and second transformer modules are at a common phase.

12. The medium voltage drive system of claim 8, wherein the transformer module includes a core having at least one column, the primary auxiliary winding wrapped around a first portion of the at least one column, the plurality of main secondary windings wrapped concentrically around each other and around a second portion of the at least one column spatially separated from the first portion, and the main primary winding wrapped around the plurality of main secondary windings.

13. The medium voltage drive system of claim 12, further comprising a first auxiliary secondary winding wrapped around the first and second portions of the at least one column, and wherein the plurality of main secondary windings and the main primary winding are concentrically wrapped there around.

14. The medium voltage drive system of claim 8, further comprising an auxiliary power source to provide the low voltage signal, the auxiliary power source corresponding to at least one of an uninterruptible power supply (UPS), a low voltage soft capacitor charger, a high frequency power supply, a portable generator, a battery bank, and a low voltage utility connection.

15. A method comprising:
switching a low voltage signal to an auxiliary primary winding of a modular transformer of a drive system having a main primary winding, a plurality of main secondary windings each coupled to a power cell, and the auxiliary primary winding, wherein the auxiliary primary winding is spatially separated from the main primary winding and the plurality of main secondary windings;
unswitching the low voltage signal from the auxiliary primary winding and switching a medium voltage signal to the main primary winding of the modular transformer when a predetermined voltage level of a bus capacitance of a power cell coupled to the modular transformer has been reached; and
detecting a loss of the medium voltage signal and switching the low voltage signal to the auxiliary primary winding of the modular transformer.

16. The method of claim 15, further comprising unswitching the low voltage signal from the auxiliary primary winding and powering down the drive system if the medium voltage signal is not detected within a predetermined time after the loss of the medium voltage signal is detected.

17. The method of claim 15, further comprising providing a first low voltage signal to a cooling device of the drive system using a first auxiliary secondary winding of the transformer module during normal operation.

18. The method of claim 17, further comprising providing a second low voltage signal to a voltage sensing device of the drive system using a second auxiliary secondary winding of the transformer module during normal operation.

* * * * *